(12) United States Patent
Marsetti et al.

(10) Patent No.: US 11,365,059 B2
(45) Date of Patent: Jun. 21, 2022

(54) SUPPORT STRUCTURE WITH IMPROVED STIFFNESS FOR AN ARTICULATED LINK CONVEYOR

(71) Applicant: MOVEX S.P.A., Castelli Calepio (IT)

(72) Inventors: Sergio Marsetti, Paradiso (CH); Matteo Marsetti, Telegate (IT)

(73) Assignee: MOVEX S.P.A., Castelli Calepio (IT)

( * ) Notice: Subject to any disclaimer, the term of this patent is extended or adjusted under 35 U.S.C. 154(b) by 0 days.

(21) Appl. No.: 17/464,196

(22) Filed: Sep. 1, 2021

(65) Prior Publication Data

US 2022/0073281 A1 Mar. 10, 2022

(30) Foreign Application Priority Data

Sep. 7, 2020 (IT) .................. 102020000021139

(51) Int. Cl.
  *B65G 21/16* (2006.01)
  *B65G 17/08* (2006.01)
  (Continued)

(52) U.S. Cl.
  CPC ........... *B65G 21/16* (2013.01); *B65G 17/086* (2013.01); *B65G 21/2009* (2013.01);
  (Continued)

(58) Field of Classification Search
  CPC .. B65G 21/16; B65G 17/086; B65G 21/2009; B65G 21/2072; B65G 15/62;
  (Continued)

(56) References Cited

U.S. PATENT DOCUMENTS 5,165,527 A * 11/1992 Garbagnati ........ B65G 21/2009
  198/690.1
7,527,144 B2 * 5/2009 Ostman .................. B65G 15/62
  198/841
(Continued)

FOREIGN PATENT DOCUMENTS

EP 2907774 A1 8/2015
WO WO-2015170982 A1 * 11/2015 ............. B65G 21/06
WO 2019016716 A1 1/2019

*Primary Examiner* — Mark A Deuble
(74) *Attorney, Agent, or Firm* — Dickinson Wright PLLC; Andrew D. Dorisio

(57) ABSTRACT

A support and guide structure for a closed-loop articulated link conveyor includes at least two guides, oriented according to respective development axis and defining respective sliding surfaces for the conveyor; and at least one support component having two surfaces opposite to each other, wherein the guides protrude from a first surface to define at least one sliding channel to house at least one portion of the articulated links of the conveyor. The support and guide structure includes at least one housing extending along a direction parallel to the development axis, and containing at least one respective reinforcing element to limit the deformation of the support component. Each reinforcing element has a cross-sectional shape compatible with the cross-sectional shape of the respective housing. Each reinforcing element is manufactured with a material having a hardness which is greater than the hardness of the materials of the guides and the support component.

14 Claims, 5 Drawing Sheets

(51) Int. Cl.
*B65G 21/20* (2006.01)
*F16B 1/00* (2006.01)

(52) U.S. Cl.
CPC ............ *B65G 21/2072* (2013.01); *F16B 1/00* (2013.01); *F16B 2001/0035* (2013.01)

(58) Field of Classification Search
CPC ....... B65G 2207/30; B65G 21/22; F16B 1/00; F16B 2001/0035
See application file for complete search history.

(56) References Cited

U.S. PATENT DOCUMENTS

| | | | |
|---|---|---|---|
| 9,434,546 B2* | 9/2016 | Cornelissen ........... | B65G 17/08 |
| 9,815,631 B2* | 11/2017 | Ghezzi ................... | B65G 21/22 |
| 2012/0152700 A1* | 6/2012 | Andreoli ................ | B65G 21/22 |
| | | | 198/836.1 |
| 2021/0163228 A1* | 6/2021 | Grävingholt ....... | B65G 21/2054 |

* cited by examiner

SUPPORT STRUCTURE WITH IMPROVED STIFFNESS FOR AN ARTICULATED LINK CONVEYOR

This application claims priority to Italian Patent Application No. 102020000021139 filed on Sep. 7, 2020, the disclosure of which is incorporated herein by reference.

TECHNICAL FIELD

The present invention generally relates to a conveyor device with articulated links and, in particular, a support and guide structure for an articulated link conveyor.

BACKGROUND

Even more particularly, the present invention relates to a curvilinear support structure for guiding an articulated link conveyor which can be made at least partially of ferromagnetic material and wherein said support structure is provided with magnets configured to attract the links of the conveyor towards the respective sliding surfaces. The present invention also relates to a curvilinear support structure for guiding an articulated link conveyor wherein the conveyor, instead of being made at least partially of ferromagnetic material, is of the so-called "tab" or "bevel" type. Regardless of the type of conveyor, the support structure can form both the upper part, or forward path, and the lower part, or return path, of a conveyor that has articulated links and is a closed-loop conveyor.

As is known, an articulated link conveyor comprises a succession of generically plate-shaped links, which extend in a direction substantially transverse to the conveyor movement direction. In the forward path of the conveyor, in a typical closed-loop configuration, these links form a support surface for the objects moved by the conveyor itself.

With respect to the conveyor movement direction, each link is connected with a preceding link and a subsequent link by means of hinges which are usually positioned in the central part of each link. The links thus form a continuous closed-loop conveyor whose forward and return portions usually overlap.

The links can be made of steel, such as those described in ISO 4348, or in plastic. If the links are made of plastic, they can conveniently be provided with hinging pins made of ferromagnetic material to interact with the magnets of the support and guide structure.

In fact, the use of a support structure provided with a respective sliding track is known for guiding each closed-loop articulated link conveyor. Each sliding track is provided with a pair of sliding surfaces which guide the sliding motion of the opposite transverse ends of the conveyor links during the respective forward path. These sliding surfaces can be placed both at a constant distance from each other and at unequal distances.

Between the two sliding surfaces there is a recess, which is also called channel, which allows to receive the articulation elements of the conveyor links. On the surface opposite to that of the channel there are usually one or more guides which channel the conveyor links in their return path on the respective support structure.

If it is necessary to guide a plurality of articulated link conveyors, the support structure can be provided with a corresponding plurality of sliding tracks, that is to say a sliding track for each articulated link conveyor. The support structure can also be provided with a plurality of return paths for the articulated link conveyors. In this case the return paths are equal in number to the number of the sliding tracks of the forward paths and are usually opposite each other, that is, placed below these sliding tracks.

In the case of links made at least partially of a ferromagnetic material, the support structure is provided with a plurality of magnets. These magnets are usually positioned below the level of the sliding plane, at the centerline of each channel. These magnets generate a magnetic field that keeps the links adhering to the sliding surfaces of the support structure. During the motion of the conveyor, without the force of attraction exerted by the magnets, the links would in fact tend to lift themselves from the respective sliding surface, endangering the balance of the objects being transported.

If the conveyor is of the so-called "tab" type, each link is provided at the bottom with tabs which engage with lower portions of the sliding tracks. The "anti-lifting" function is therefore obtained by the interaction between these tabs and the corresponding lower portions of the sliding tracks rather than the interaction between the magnets and the ferromagnetic material. If, on the other hand, the conveyor is of the so-called "bevel" type, each link is provided at the bottom with a dovetail shaped portion, designed to slide in a channel between the sliding tracks, which has a shape compatible with the one of the lower shaped portion of the links. This dovetail shape prevents the links from lifting from the respective sliding surface.

The sliding tracks for articulated link conveyors can have a straight axis or a curvilinear axis. Examples of curvilinear axis sliding tracks for link conveyors are described, for example, in documents EP 2907774, EP 3546394 and EP 3572358 in the name of the same applicant, as well as in document WO 2019/016716.

A drawback of the sliding tracks for articulated link conveyors, especially if they have a curvilinear axis and if they are made of plastic, is due to their relative instability. In fact, although these sliding tracks are suitably fixed to respective support frames, they can be subject to undesired movements due to various thermal variations and/or tensioning, due for example to the forces generated during the movement of the link conveyor and/or the weight of the objects on the conveyor itself.

SUMMARY

The object of the present invention is therefore to provide a support and guide structure for an articulated link conveyor which is capable of solving the aforementioned drawbacks of the prior art in an extremely simple, economical and particularly functional way.

In detail, it is an object of the present invention to provide a support and guide structure for an articulated link conveyor which has an improved structural stiffness (intended as resistance to deformation) compared to the one of similar support and guide structures according to the prior art.

Another object of the present invention is to provide a support and guide structure for an articulated link conveyor which, although more rigid and consequently with better resistance to deformation, maintains the same ease of assembly and use as similar support and guide structures according to the prior art.

These objects according to the present invention will be achieved by providing a support and guide structure for an articulated link conveyor as set forth in claim 1.

Further features of the invention are highlighted by the dependent claims, which are an integral part of the present description.

BRIEF DESCRIPTION OF THE DRAWINGS

The features and advantages of a support and guide structure for an articulated link conveyor according to the present invention will be clearer from the following exemplifying and hence non-limiting description, referring to the attached schematic drawings in which.

DETAILED DESCRIPTION

Figure 1:
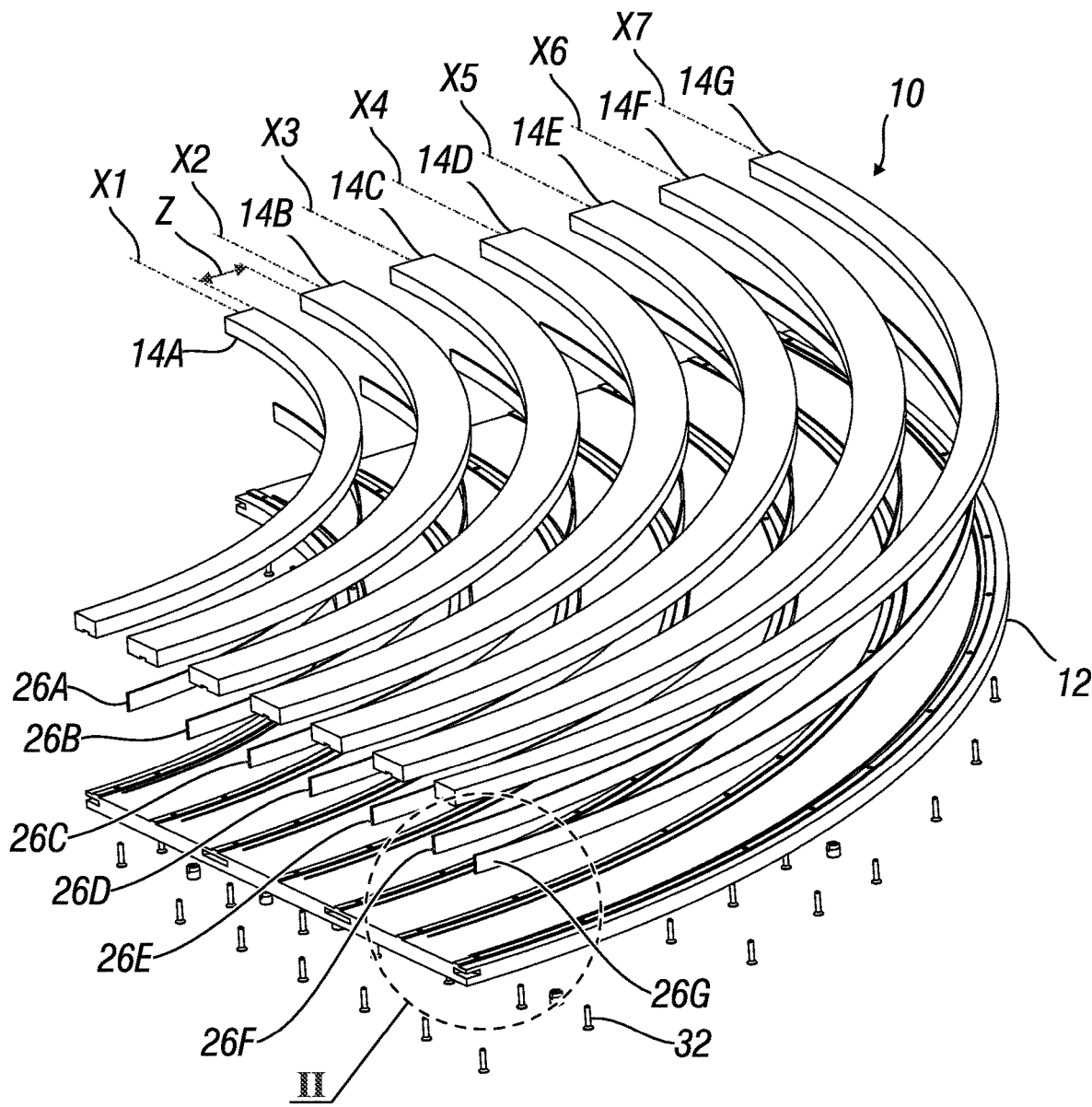
FIG. 1 is an exploded view, in perspective from above, of a first embodiment of the support and guide structure for an articulated link conveyor according to the present invention.
Figure 2:
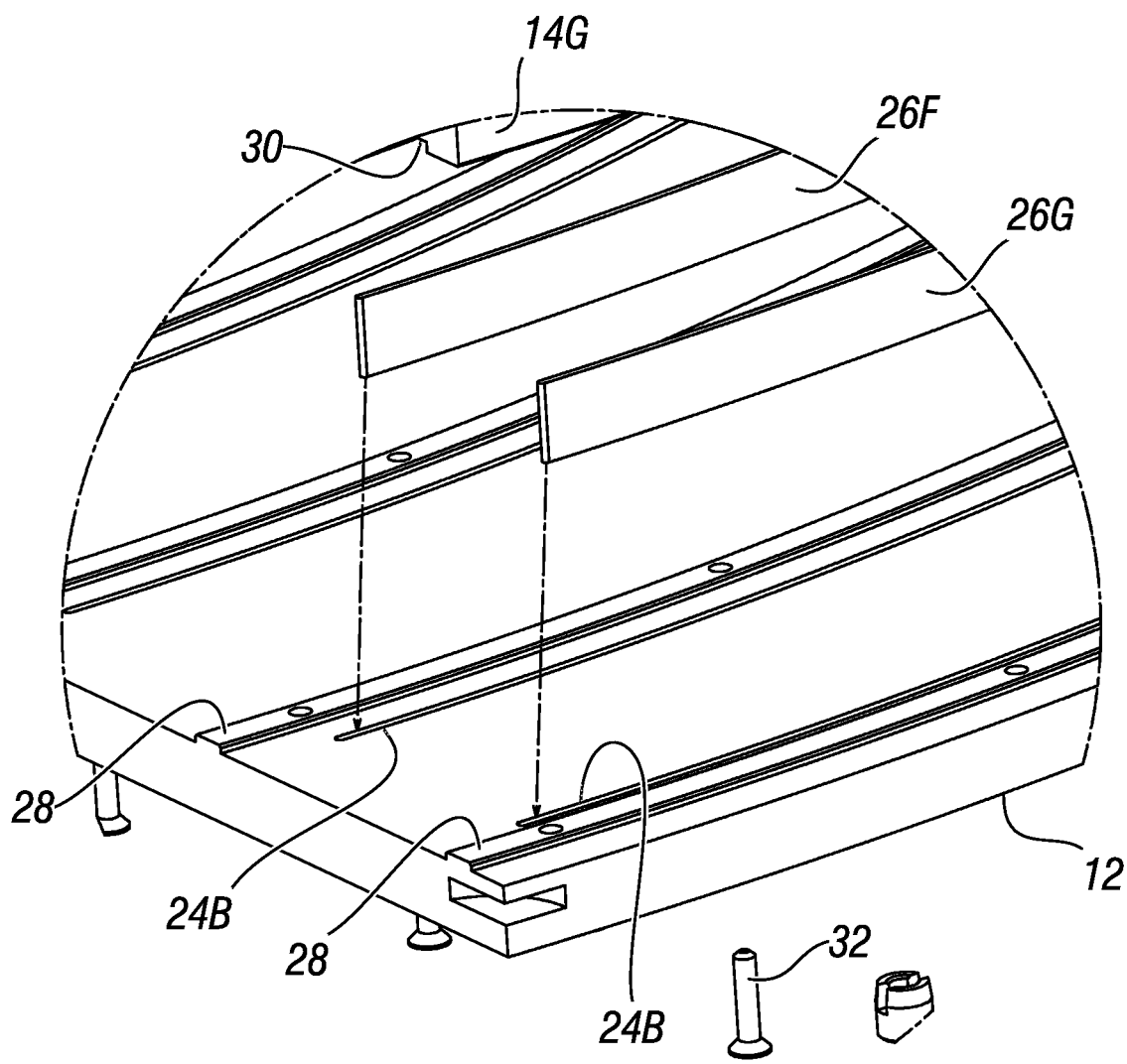
FIG. 2 is an enlarged view of the detail indicated with II in FIG. 1.

With reference to the figures, a preferred embodiment of the support and guide structure for an articulated link conveyor according to the present invention is shown. The support and guide structure is indicated as a whole with reference number 10. The support and guide structure 10 comprises, in a per se known manner, at least two guides 14A, 14B, 14C, 14D, 14E, 14F, 14G distinct and arranged at a predefined distance Z from each other. The guides 14A, 14B, 14C, 14D, 14E, 14F, 14G are oriented according to respective development axes X1, X2, X3, X4, X5, X6, X7 and define respective sliding surfaces for a sliding path of the conveyor with articulated link (not shown).

The support and guide structure 10 also comprises, again in a per se known manner, at least one support component 12 of the guides 14A, 14B, 14C, 14D, 14E, 14F, 14G, which develops on a respective plane P. This support component 12 in turn comprises at least one first surface 16, or upper surface, and at least one second surface 18, or lower surface, opposite to each other. The guides 14A, 14B, 14C, 14D, 14E, 14F, 14G protrude from the first surface 16 to define at least one sliding channel 20 (FIG. 5), which is delimited by side walls of contiguous pairs of these guides 14A, 14B, 14C, 14D, 14E, 14F, 14G and by at least one portion of the first surface 16 of the support component 12. Each sliding channel 20 allows to house at least one portion of the articulated links of the conveyor.

In the case the articulated link conveyor is made at least partially of a ferromagnetic material, the support component 12 could comprise a plurality of cavities 22 each designed to house one or more magnets (not shown). Preferably, the cavities 22 are obtained at the second surface 18 of the support component 12 and are open, that is to say accessible through this second surface 18. This allows easy insertion/extraction of the magnets, which once inserted into the respective cavities 22 can be covered with suitable closing plates (not shown).

In order to increase its structural stiffness, thereby limiting its deformability, the support and guide structure 10 comprises at least one housing 24, 24A, 24B, 24C, 24D extending for at least half the length of said support component 12 along a direction parallel to said development axis X1, X2, X3, X4, X5, X6, X7 of the guides 14A, 14B, 14C, 14D, 14E, 14F, 14G. Each housing 24, 24A, 24B, 24C, 24D contains at least one respective reinforcing element 26A, 26B, 26C, 26D, 26E, 26F, 26G to limit the deformation of the support component 12 and, hence, of the guides 14A, 14B, 14C, 14D, 14E, 14F, 14G along a direction perpendicular to said plane P, on which this support component 12 lies.

Each reinforcing element 26A, 26B, 26C, 26D, 26E, 26F, 26G has a cross-sectional shape which is compatible with the cross-sectional shape of the respective housing 24, 24A, 24B, 24C, 24D. Moreover, each reinforcing element 26A, 26B, 26C, 26D, 26E, 26F, 26G is conveniently made of a material having a hardness, defined as resistance to permanent deformation, which is greater than the hardness of the materials the guides 14A, 14B, 14C, 14D, 14E, 14F, 14G and the support component 12 are made of.

Figure 4:
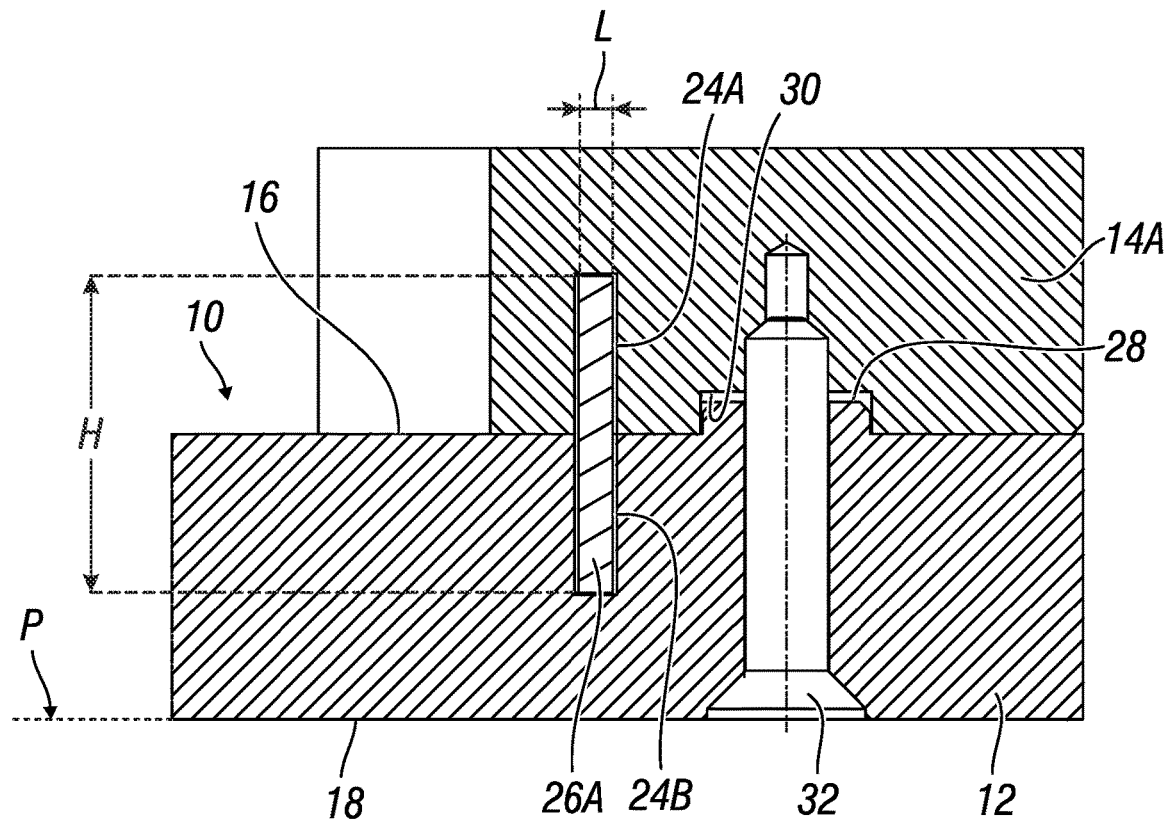
FIG. 4 is a cross-sectional view of a detail of the support and guide structure of FIG. 1.

Conveniently, in order to increase the structural stiffness of the support and guide structure 10, each reinforcing element 26A, 26B, 26C, 26D, 26E, 26F, 26G consists of a lamellar element with rectangular cross section and having a length, measured along the respective development axis X1, X2, X3, X4, X5, X6, X7, which is substantially equal to the length of the respective guide 14A, 14B, 14C, 14D, 14E, 14F, 14G. Each lamellar element 26A, 26B, 26C, 26D, 26E, 26F, 26G can also have a height (FIG. 4), measured along a direction perpendicular to the development plane P of the support component, which is greater than the respective width L, measured along a direction parallel to said plane P.

Preferably, both the guides 14A, 14B, 14C, 14D, 14E, 14F, 14G and the support component 12 are made of polymeric materials. Merely by way of example, at least the guides 14A, 14B, 14C, 14D, 14E, 14F, 14G could be manufactured with a very high molecular weight polyethylene-based material (UHMW-PE), with the addition of solid lubricants. This material is known under the trade name of BluLub®. Each reinforcing element 26A, 26B, 26C, 26D, 26E, 26F, 26G is instead conveniently manufactured with a metallic material, such as steel, for example. In fact, steel has a hardness, measured against the most well-known hardness scales (Brinell, Knoop, Mohs, Rosiwal and Vickers), which is greater than the hardness of the polymeric material the support component 12 is made of.

Figure 3:
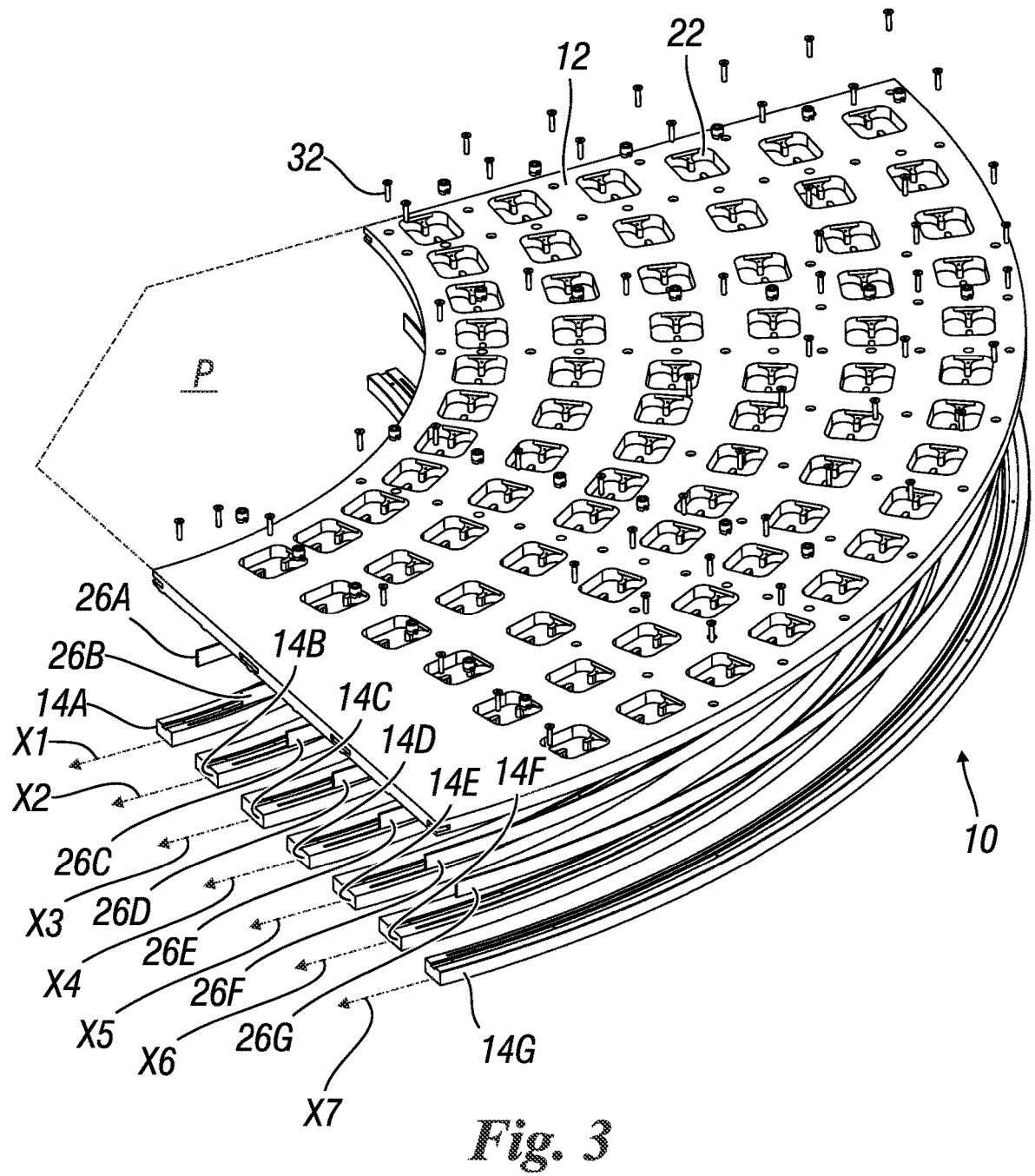
FIG. 3 is another exploded view, in perspective from below, of the support and guide structure of FIG. 1.

Preferably, in most of the embodiments shown in the figures, each housing 24, 24A, 24B, 24C, 24D is obtained in a portion of the support and guide structure 10 placed between at least one respective guide 14A, 14B, 14C, 14D, 14E, 14F, 14G and said support component 12. In order to increase the structural stiffness of the support and guide structure 10 in the best possible way and uniformly, each housing 24, 24A, 24B, 24C, 24D also extends for at least part of the length of the respective guide 14A, 14B, 14C, 14D, 14E, 14F, 14G along the respective development axis X1, X2, X3, X4, X5, X6, X7, preferably for the entire length of the respective guide 14A, 14B, 14C, 14D, 14E, 14F, 14G along the respective development axis X1, X2, X3, X4, X5, X6, X7 (as shown in FIGS. 1 and 3).

According to the first embodiment of the support and guide structure 10, shown in FIGS. 1 to 4, the guides 14A, 14B, 14C, 14D, 14E, 14F, 14G are manufactured as elements which are separated with respect to said support component 12. Reversible fastening means 28, 30, 32 are therefore provided for coupling the guides 14A, 14B, 14C, 14D, 14E, 14F, 14G with the support component 12.

According to this first embodiment of the support and guide structure 10, therefore, each housing 24A, 24B can consist of (see in particular the sectional view of FIG. 4):

a first groove 24A, which is obtained within a respective guide 14A and which extends along the respective development axis X1 of this guide 14A; and a second groove 24B, which is obtained within the support component 12 and which extends along the same development axis X1 of the corresponding first groove 24A.

Consequently, the first groove 24A and the second groove 24B form a closed channel when the respective guide 14A is coupled with the support component 12 by means of the respective reversible fastening means 28, 30, 32. Preferably, these reversible fastening means 28, 30, 32 can be of the "tooth 28-channel 30" type, so as to obtain an easily releasable shape coupling between the guides 14A, 14B, 14C, 14D, 14E, 14F, 14G and the support component 12. Again preferably, the reversible fastening means 28, 30, 32 can comprise a plurality of fastening screws 32 for coupling the guides 14A, 14B, 14C, 14D, 14E, 14F, 14G with the support component 12.

Figure 5:
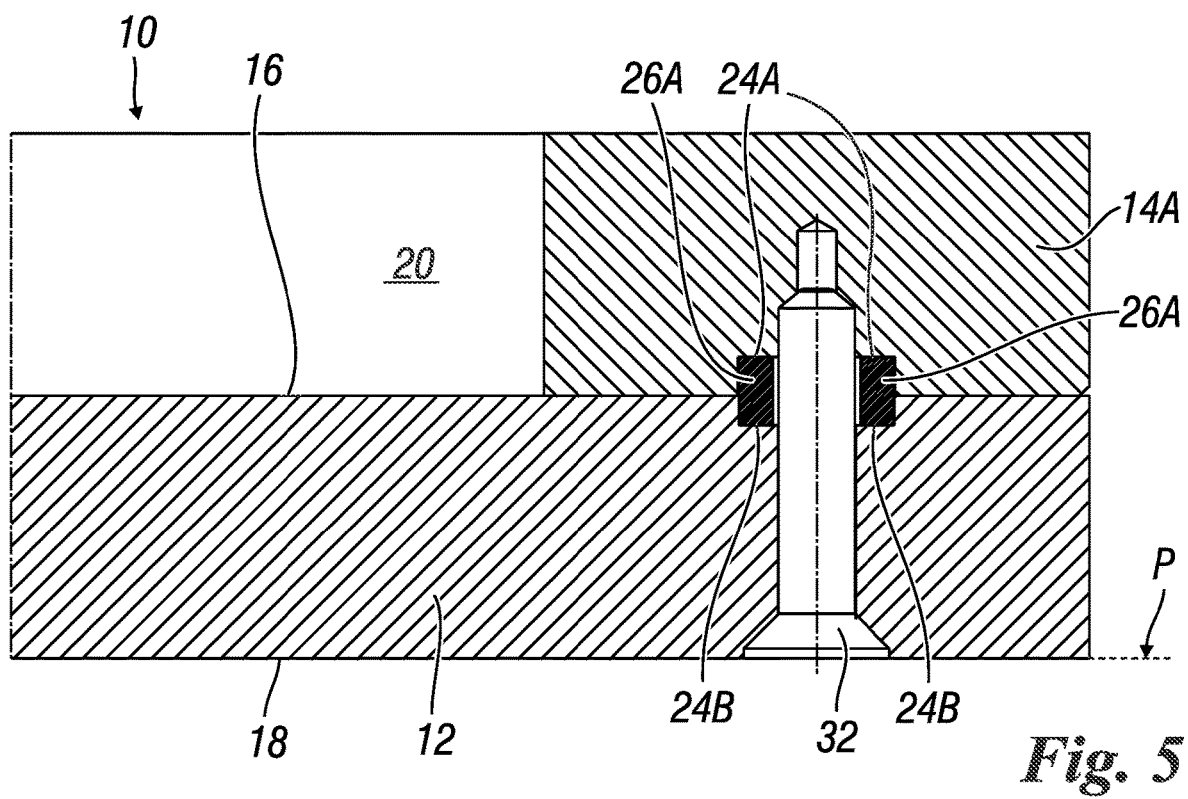
FIG. 5 is a cross-sectional view of a detail of a second embodiment of the support and guide structure for an articulated link conveyor according to the present invention.

FIG. 5 shows a detail of a second embodiment of the support and guide structure 10, which is essentially a variant of the first embodiment shown in FIGS. 1 to 4. In this second embodiment of the support and guide structure 10 the reinforcing element 26A form a portion of the reversible fastening means between each guide 14A and the support component 12. In other words, each reinforcing element 26A can be interposed with a "tooth" function between a respective guide 14A and the support component 12, thus making the presence of the "tooth-channel" coupling superfluous. For example, as shown in FIG. 5, two distinct reinforcing elements 26A can be provided, parallel to each other and again oriented along the respective development axis X1 of the guide 14A, to allow coupling, however assisted by one or more fastening screws 32, between this guide 14A and the support component 12.

Figure 6:
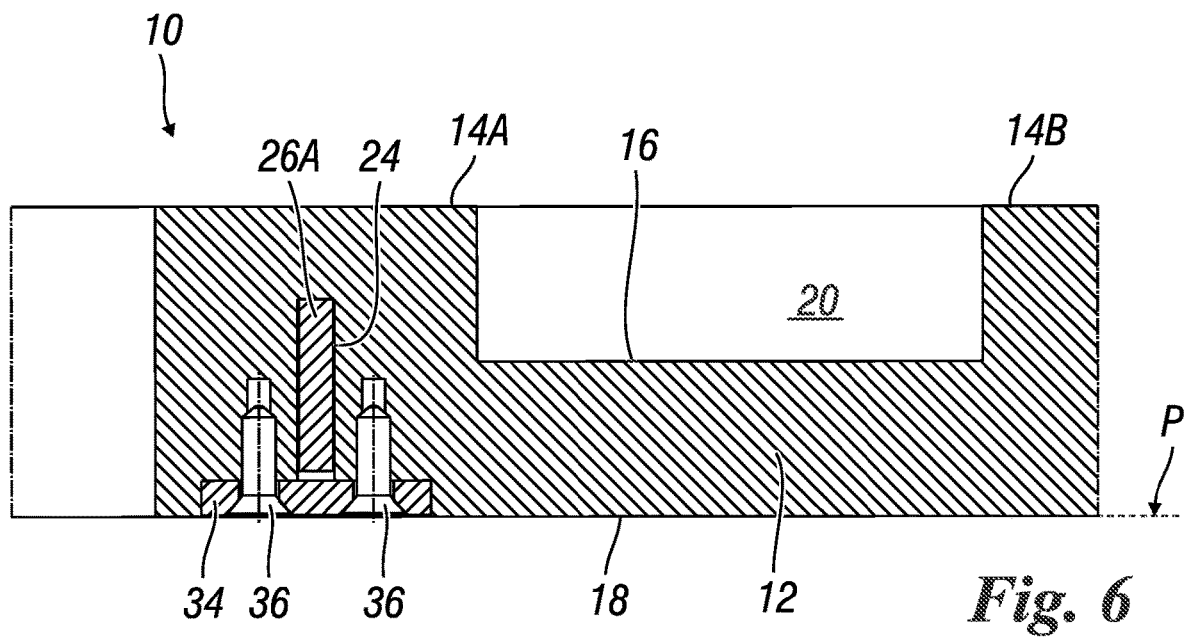
FIG. 6 is a cross-sectional view of a detail of a third embodiment of the support and guide structure for an articulated link conveyor according to the present invention.

FIG. 6 shows a detail of a third embodiment of the support and guide structure 10. In this third embodiment of the support and guide structure 10 all the guides 14A, 14B are integrally manufactured in one piece with the support component 12. In other words, the entire support and guide structure 10 is substantially manufactured in one piece. Each housing 24 for a respective reinforcing elements 26A thus consists of a groove 24 which is partly obtained within a respective guide 14A and partly within the support component 12. This groove 24 extends along the respective development axis X1 of the guide 14A. Reversible closing means 34, 36 are also provided at the second surface 18 of the support component 12, so as to close the groove 24 when a respective reinforcing element 26A is housed therein. Preferably, these reversible closing means 34, 36 comprise at least one plate 34, which can be positioned at the second surface 18 of the support component 12, and one or more screws 36, arranged to fasten a respective plate 34 on the support component 12 parallel to its second surface 18.

Figure 7:
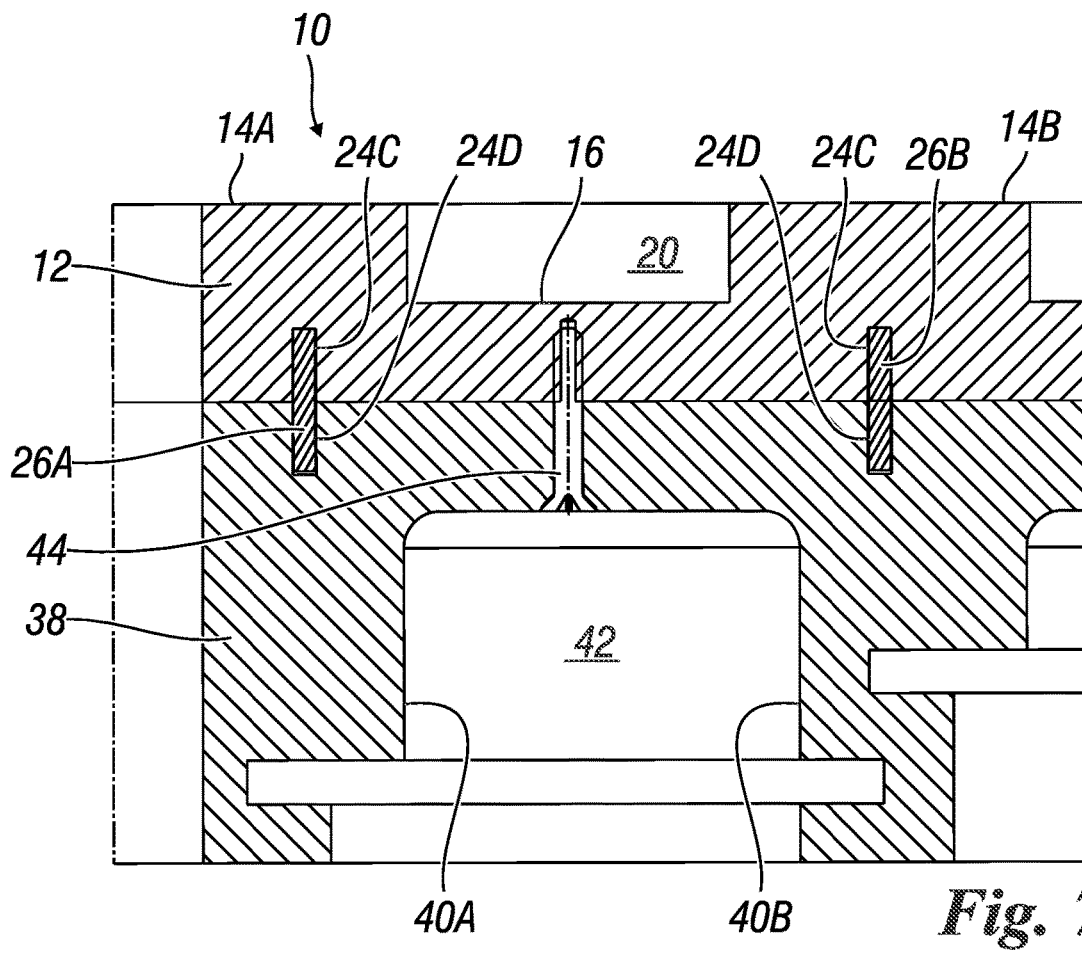
FIG. 7 is a cross-sectional view of a detail of a fourth embodiment of the support and guide structure for an articulated link conveyor according to the present invention.

FIG. 7 shows a detail of a fourth embodiment of the support and guide structure 10. In this fourth embodiment, the support and guide structure 10 comprises at least one lower guiding element 38, which is adapted to support and guide the conveyor in its return path. In detail, the lower guiding element 38 is fastened on the support component 12, at its second surface 18 and by means of suitable fastening means 44, and comprised at least two walls 40A, 40B within which a respective return channel 42 is obtained which houses at least one portion of the articulated links of the conveyor in its return path. Each return channel 42 is therefore in an opposite position with respect to a corresponding sliding channel 20, or forward channel, obtained between contiguous pairs of guides 14A, 14B.

According to this fourth embodiment of the support and guide structure 10, each housing 24C, 24D consists of a first groove 24C, which is obtained within the support component 12, and a second groove 24D, which is obtained within the lower guiding element 38 (see in particular the sectional view of FIG. 7). Each first groove 24C of the support component 12 and a corresponding second groove 24D of the lower guiding element 38 form in this way a closed channel when the lower guiding element 38 is fastened on the support component 12.

It has thus been seen that the support and guide structure for an articulated link conveyor according to the present invention achieves the objects highlighted above. In particular, some comparative deformation tests were carried out both on a traditional support and guide structure, and on a similar support and guide structure according to the present invention, that is to say provided with metal lamellar reinforcing elements. The deformation tests were carried out in the presence of a static load of 10 kg on each support and guide structure, which in turn was cantilevered on a respective support frame. The deformation tests were also carried out using, on the support and guide structure according to the present invention, two different types of metal lamellar reinforcing elements, that is to say with a height H equal to 1.7 mm and 3 mm. The results of the deformation tests have shown that, with the same load (10 kg), a traditional specific support and guide structure undergoes a maximum deformation that is greater than 39 mm (in the case of reinforcing elements with a height H equal to 1.7 mm) or even 80.5 mm (in the case of reinforcing elements with a height H equal to 3 mm) with respect to the deformation of a similar support and guide structure according to the present invention. In absolute terms, in fact, considering the load conditions described above, the traditional support and guide structure has undergone a maximum deformation equal to 108 mm, while the similar support and guide structure according to the present invention has undergone maximum deformations equal to 42 mm (in case of reinforcement elements with a height H equal to 1.7 mm) and equal to only 27.5 mm (in case of reinforcement elements with a height H equal to 3 mm).

The support and guide structure for an articulated link conveyor of the present invention thus conceived is however susceptible of numerous modifications and variations, all of which falling within the scope of the same inventive concept; furthermore, all the details can be replaced by technically equivalent elements. In practice, the materials used, as well as the shapes and dimensions, may be any according to the technical requirements.

The scope of protection of the invention is therefore defined by the attached claims.

The invention claimed is:

1. A support and guide structure (10) for an articulated link conveyor, the support and guide structure (10) comprising:

at least two guides (14A, 14B, 14C, 14D, 14E, 14F, 14G) distinct and arranged at a predefined distance (Z) from each other, said guides (14A, 14B, 14C, 14D, 14E, 14F, 14G) being oriented according to respective development axis (X1, X2, X3, X4, X5, X6, X7) and defining respective sliding surfaces for a sliding path of the articulated link conveyor;

at least one support component (12) developing on a respective plane (P), said support component (12) comprising at least one first surface (16) and at least one second surface (18) opposite to each other, wherein said guides (14A, 14B, 14C, 14D, 14E, 14F, 14G) protrude from said first surface (16) to define at least one sliding channel (20) delimited by side walls of contiguous pairs of said guides (14A, 14B, 14C, 14D, 14E, 14F, 14G) and by at least one portion of said first surface (16), said at least one sliding channel (20) allowing to house at least one portion of the articulated links of the conveyor, the support and guide structure (10) comprising at least one housing (24; 24A, 24B, 24C, 24D) extending for at least half the length of said support component (12) along a direction parallel to said development axis (X1, X2, X3, X4, X5, X6, X7), said housing (24; 24A, 24B, 24C, 24D) containing at least one respective reinforcing element (26A, 26B, 26C, 26D, 26E, 26F, 26G) to limit the deformation of at least said support component (12) along a direction perpendicular to said plane (P), wherein each reinforcing element (26A, 26B, 26C, 26D, 26E, 26F, 26G) has a cross-sectional shape which is compatible with the cross-sectional shape of the respective housing (24; 24A, 24B, 24C, 24D) and wherein each reinforcing element (26A, 26B, 26C, 26D, 26E, 26F, 26G) is manufactured with a material having a hardness, defined as resistance to permanent deformation, which is greater than the hardness of the materials said guides (14A, 14B, 14C, 14D, 14E, 14F, 14G) and said support component (12) are manufactured with.

2. The support and guide structure (10) according to claim 1, characterized in that each housing (24; 24A, 24B) is obtained in a portion of the support and guide structure (10) placed between at least one respective guide (14A, 14B, 14C, 14D, 14E, 14F, 14G) and said support component (12), wherein each housing (24; 24A, 24B) extends for at least part of the length of the respective guide (14A, 14B, 14C, 14D, 14E, 14F, 14G) along the respective development axis (X1, X2, X3, X4, X5, X6, X7).

3. The support and guide structure (10) according to claim 2, characterized in that said guides (14A, 14B, 14C, 14D, 14E, 14F, 14G) are manufactured as elements which are separated with respect to said support component (12), reversible fastening means (28, 30; 32; 26A) being provided for coupling said guides (14A, 14B, 14C, 14D, 14E, 14F, 14G) with said support component (12).

4. The support and guide structure (10) according to claim 3, characterized in that each housing (24; 24A, 24B) consists of:

a first groove (24A), which is obtained within a respective guide (14A, 14B, 14C, 14D, 14E, 14F, 14G) and which extends along the respective development axis (X1, X2, X3, X4, X5, X6, X7) of said guide (14A, 14B, 14C, 14D, 14E, 14F, 14G); and a second groove (24B), which is obtained within said support component (12) and which extends along the same development axis (X1, X2, X3, X4, X5, X6, X7) of said first groove (24A), wherein said first groove (24A) and said second groove (24B) form a closed channel when the respective guide (14A, 14B, 14C, 14D, 14E, 14F, 14G) is coupled with said support component (12) by means of the respective reversible fastening means (28, 30; 32).

5. The support and guide structure (10) according to claim 3, characterized in that said reversible fastening means (28, 30; 32) are of the "tooth (28)-channel (30)" type, for obtaining a shape coupling between said guides (14A, 14B, 14C, 14D, 14E, 14F, 14G) and said support component (12), said reversible fastening means (28, 30; 32) comprising a plurality of fastening screws (32) for coupling said guides (14A, 14B, 14C, 14D, 14E, 14F, 14G) with said support component (12).

6. The support and guide structure (10) according to claim 3, characterized in that said reversible fastening means (26A) comprise at least one reinforcing element (26A) interposed with a "tooth" function between a respective guide (14A) and said support component (12).

7. The support and guide structure (10) according to claim 1, characterized in that said guides (14A, 14B, 14C, 14D, 14E, 14F, 14G) are integrally manufactured in one piece with said support component (12).

8. The support and guide structure (10) according to claim 7, characterized in that each housing (24; 24A, 24B) consists of a groove (24) which is partly obtained within a respective guide (14A, 14B, 14C, 14D, 14E, 14F, 14G) and partly within said support component (12), wherein said groove (24) extends along the respective development axis (X1, X2, X3, X4, X5, X6, X7) of said guide (14A, 14B, 14C, 14D, 14E, 14F, 14G) and wherein reversible closing means (34, 36) are provided at said second surface (18) of the support component (12) to close said groove (24) when a respective reinforcing element (26A, 26B, 26C, 26D, 26E, 26F, 26G) is housed therein.

9. The support and guide structure (10) according to claim 8, characterized in that said reversible closing means (34, 36) comprise at least one plate (34), which can be positioned at said second surface (18) of the support component (12), and one or more screws (36), arranged to fasten said plate (34) on said support component (12) parallel to said second surface (18).

10. The support and guide structure (10) according to claim 1, characterized in that it comprises at least one lower guiding element (38), fastened on said support component (12) and comprising at least two walls (40A, 40B) within which a respective return channel (42) is obtained which houses at least one portion of the articulated links of the conveyor in its return path, wherein each housing (24C, 24D) consists of a first groove (24C), which is obtained within said support component (12), and a second groove (24D), which is obtained within said lower guiding element (38), so that each first groove (24C) of said support component (12) and a corresponding second groove (24D) of said lower guiding element (38) form a closed channel.

11. The support and guide structure (10) according to claim 1, characterized in that said at least one reinforcing element (26A, 26B, 26C, 26D, 26E, 26F, 26G) consists of a lamellar element with rectangular cross section and having a length, measured along the respective development axis (X1, X2, X3, X4, X5, X6, X7), which is substantially equal to the length of the respective guide (14A, 14B, 14C, 14D, 14E, 14F, 14G).

12. The support and guide structure (10) according to claim 11, characterized in that each lamellar element (26A, 26B, 26C, 26D, 26E, 26F, 26G) has a height (H), measured along a direction perpendicular to said plane (P), which is greater than the respective width (L), measured along a direction parallel to said plane (P).

13. The support and guide structure (10) according to claim 1, characterized in that said guides (14A, 14B, 14C, 14D, 14E, 14F, 14G) and said support component (12) are manufactured with polymeric materials, whereas said at least one reinforcing element (26A, 26B, 26C, 26D, 26E, 26F, 26G) is made of a metallic material.

14. The support and guide structure (10) according to claim 1, characterized in that said support component (12) comprises a plurality of cavities (22) each designed to house one or more magnets.

\* \* \* \* \*